United States Patent
Sigler et al.

(10) Patent No.: US 9,676,065 B2
(45) Date of Patent: Jun. 13, 2017

(54) RESISTANCE SPOT WELDING OF ALUMINUM TO ALUMINUM AND STEEL TO STEEL

(71) Applicant: GM Global Technology Operations LLC, Detroit, MI (US)

(72) Inventors: David R. Sigler, Shelby Township, MI (US); Michael J. Karagoulis, Okemos, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 189 days.

(21) Appl. No.: 13/621,299

(22) Filed: Sep. 17, 2012

(65) Prior Publication Data

US 2013/0015164 A1    Jan. 17, 2013

Related U.S. Application Data

(63) Continuation-in-part of application No. 12/768,928, filed on Apr. 28, 2010, now Pat. No. 8,274,010.

(51) Int. Cl.
| | |
|---|---|
| *B23K 11/11* | (2006.01) |
| *B23K 35/22* | (2006.01) |
| *B23K 11/30* | (2006.01) |
| *B23K 35/30* | (2006.01) |
| *B23K 103/04* | (2006.01) |
| *B23K 103/10* | (2006.01) |

(52) U.S. Cl.
CPC .......... *B23K 35/222* (2013.01); *B23K 11/115* (2013.01); *B23K 11/3063* (2013.01); *B23K 35/302* (2013.01); *B23K 2203/04* (2013.01); *B23K 2203/10* (2013.01)

(58) Field of Classification Search
USPC .................... 219/92, 93, 94, 117.1, 118, 119
See application file for complete search history.

(56) References Cited

U.S. PATENT DOCUMENTS

| | | | |
|---|---|---|---|
| 6,861,609 B2 | 3/2005 | Sigler | |
| 2008/0078749 A1* | 4/2008 | Sigler et al. | 219/119 |
| 2009/0302009 A1 | 12/2009 | Sigler | |
| 2010/0258536 A1 | 10/2010 | Sigler | |

FOREIGN PATENT DOCUMENTS

JP         2009090340         4/2009

* cited by examiner

*Primary Examiner* — Brian Jennison
(74) *Attorney, Agent, or Firm* — Reising Ethington P.C.

(57) ABSTRACT

A method for welding a plurality of aluminum to aluminum welds and a plurality of steel to steel welds using the same welder includes providing a resistance spot welder with a pair of weld electrodes having an electrode face radius of curvature in the range between 20 mm and 40 mm. The series of aluminum to aluminum welds is first made, and then, after completing the aluminum to aluminum welds, the series of steel to steel welds are made. After completing the steel to steel welds the weld electrodes are cleaned by an abrasive to remove any buildup or contamination of aluminum on the electrodes. In the event the electrodes have mushroomed, then dressing of the electrodes is provided and then the abrasive cleaning is performed to restore the surface texture.

20 Claims, 5 Drawing Sheets

RESISTANCE SPOT WELDING OF ALUMINUM TO ALUMINUM AND STEEL TO STEEL

CROSS-REFERENCE TO RELATED APPLICATION

This application is a Continuation in Part of Ser. No. 12/768,928, filed Apr. 28, 2010, issued as U.S. Pat. No. 8,274,010 on Sep. 25, 2012.

FIELD OF THE INVENTION

The present invention relates to welding together metal panels and more particularly provides a method for the resistance spot welding together of both aluminum to aluminum panels and steel to steel panels using a single weld gun.

BACKGROUND OF THE INVENTION

Automotive vehicle body manufacturing operations include the joining together of two sheet metal layers by resistance spot welding. The spot welding operation is typically accomplished by assembling the sheet metal panels in a suitable fixture or other clamping apparatus and then pressing welding electrodes against opposite sides of adjoining metal panels. The weld electrodes provide both clamping force and also communicate weld current to the point of contact with the metal panels.

The weld gun is typically operated by a robot so that a succession of welds can be made in a particular manufacturing cell. Manufacturing efficiencies demand that the welds be made in very rapid succession as fast as possible, to thereby reduce the number of welders and robots that are required to assemble the vehicle body.

Modern motor vehicles may typically employ both steel panels and aluminum panels in order to optimize the strength and weight characteristics of the vehicle body. Thus the welding operations for a vehicle body may include both the welding of aluminum panels to aluminum panels and also the welding of steel panels to steel panels. Steel panels are often galvanized with a zinc coating as a corrosion preventative.

With regard to the spot welding of steel, it is known that over a number of welds a copper electrode will soften and mushroom in shape because of the combined action of clamping pressure, high temperature and the alloying of the copper with the galvanized steel surface. Accordingly, the prior art has recognized that when the copper electrode is used to weld steel or galvanized steel, the electrode must be periodically dressed in order to reshape the electrode to extend its useful life and maintain weld quality.

With regard to the use of a copper electrode to weld aluminum panels, it is known that a buildup of aluminum from the aluminum sheet onto the electrode face can result in the formation of a low-melting-point Cu—Al eutectic that eventually produces pits in the electrode's surface. To minimize the pitting reaction, the prior art has recognized that the copper electrode used for welding aluminum panels needs to be occasionally resurfaced in order to remove the contamination from the surface thereof.

Thus, with respect to welding aluminum to aluminum, U.S. Pat. No. 6,861,609, issued Mar. 1, 2005, assigned to the assignee of this invention provides for the texturing of the electrode face by blasting with small grit particles or sanding with course abrasive paper in order to clean and restore the face of the copper electrode. In addition, U.S. patent application Ser. No. 11/536,001, filed Sep. 28, 2006, now U.S. Pat. No. 8,436,269, issued May 17, 2013, also assigned to the assignee of this invention discloses a method for using a tool to dress the tip of the copper electrode and make a series of concentric rings thereon. Cutting or dressing the surface during the formation of the concentric rings was designed to both clean the electrode surface and produce a texture.

Thus, although the prior art has developed techniques for welding steel to steel, and techniques for welding aluminum to aluminum, the welding of steel to steel and aluminum to aluminum using one welding gun has not been done for two primary reasons. First, welding electrodes designed to spot weld one of the materials are typically not suitable for spot welding the other material. For example, a ballnose electrode used to spot weld steel causes excessive sheet deformation and weld metal expulsion when used to spot weld aluminum. Second, contamination of aluminum panels by iron-containing particles transferred by the welding electrode could cause galvanic corrosion and premature panel deterioration.

It would therefore be desirable to provide further improvements in the welding process so that a single weld gun, using the same pair of copper electrodes could make both welds of steel to steel panels and also aluminum to aluminum panels without causing the problems given above.

SUMMARY OF THE INVENTION

A method for welding a plurality of aluminum to aluminum welds and a plurality of steel to steel welds using the same welder includes providing a resistance spot welder with a pair of weld electrodes having an electrode face radius of curvature in the range between 20 mm and 40 mm. The electrode material is selected with sufficient high temperature strength that the steel welding process does not excessively soften the electrode and harm the effectiveness of the texture used for aluminum spot welding. The series of aluminum to aluminum welds is made, and then, after completing the aluminum to aluminum welds, the series of steel to steel welds are made. After completing the steel to steel welds, the weld electrodes are cleaned by an abrasive to remove any buildup or contamination of iron on the electrodes. In the event the electrodes have mushroomed, then dressing of the electrodes is provided and then the abrasive cleaning is performed to restore the surface texture.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

Figure 1:
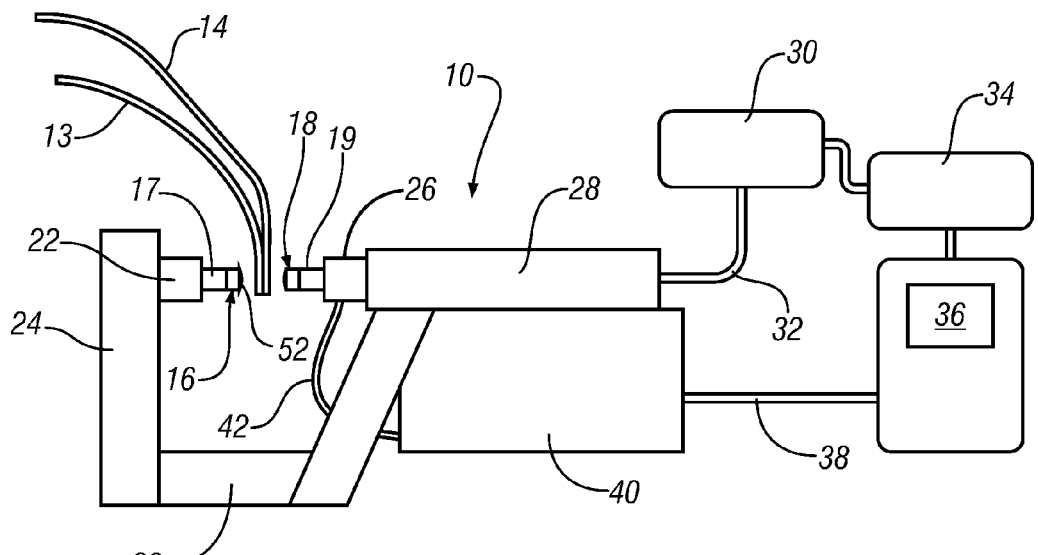
FIG. 1 is a schematic representation of a welding apparatus using weld electrodes of this invention in spot welding of both aluminum to aluminum and steel to steel.

FIG. 1 is a schematic illustration of a side view of a representative spot welding gun apparatus 10 with the associated equipment utilized in spot welding operations. In such an operation, an assembly of two or more sheet metal panels 13 and 14 to be welded is prepared and delivered by a conveyor or other device, to the welding gun apparatus 10. The welding gun apparatus 10 is typically mounted on a robot which moves the welding gun apparatus 10 along the sheet metal panels 13 and 14 to rapidly accomplish a succession of individual electric resistance spot welds. The metal panels 13 and 14 can both be of aluminum, or can both be steel.

In FIG. 1, the metal panels 13 and 14 are shown poised between a pair of axially aligned and opposing electrodes 16 and 18 of a welding gun arm 20. The gun arm 20 is in the configuration of a C so that the opposing electrodes 16 and 18 can be brought to bear and press upon opposite sides of the metal panels 13 and 14. In the arrangement shown, electrode 16 is mounted on a shank 17 which is inserted in a holder 22 attached to a fixed arm 24 of the welding gun arm 20. The other electrode 18 is mounted on a shank 19 and inserted in another holder 26 carried on an air cylinder or servo motor 28. Air cylinder or servo motor 28 is adapted to axially move the electrode 18 into clamping engagement with the outer surface of the panel 14. A source of high pressure air from a remote source, not shown, delivers air through a programmable air regulator 30 through air line 32 to the cylinder 28 to provide clamping force. Alternatively, a servo-motor control provides current and voltage to the servo motor to provide clamping. During a spot welding sequence, the timely application of air pressure to the air cylinder 28 or movement of the servo motor advances holder 26 so that electrode 18 presses the sheets 13 and 14 against stationary electrode 16 with a force in the order of 500 to 1,500 pounds.

Weld gun 20, typically mounted on the end of a robot arm, is connected to a robot weld controller 34. Controller 34 manages and actuates the programmable air regulator 30 and also a welding controller 36. Welding controller 36 regulates the passage of primary welding current to the welding transformer, which supplies current to the electrodes. On command of the welding controller 36 primary current is delivered through primary current line 38 to weld transformer 40. Weld transformer 40 converts the primary current to a lower voltage higher current secondary welding current which is then provided through a secondary current line 42 and electrode holder 26 as well as conductive gun arm 20 and electrode holder 22.

Figure 2:
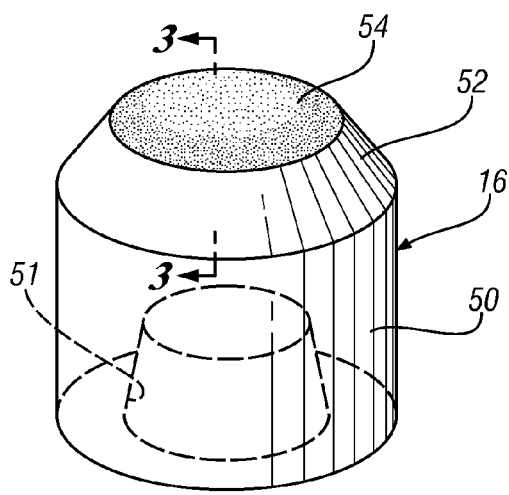
FIG. 2 is a perspective view of an electrode for use in the practice of this invention.
Figure 3:
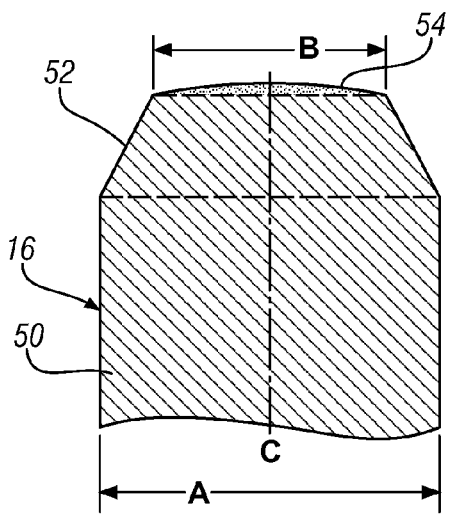
FIG. 3 is a side elevation view of the electrode of FIG. 2 having parts broken away.

Turning now to FIG. 2 there is disclosed a single design of a copper electrode 16 particularly designed to accomplish both the welding together of steel panels and the welding together of aluminum panels. As seen in FIG. 2 the electrode 16 has a round body 50 with a truncated conical end 52. Body 50 has a hollow receptacle 51 adapted to receive a shank 17 for insertion into the electrode holder 22. Weld face 54 of the truncated conical end 52 is crowned. In particular, we have found that the radius of curvature of the crown of electrode weld face 54 should be in the range between 20 mm and 40 mm in order to provide an electrode that is effective to make both the aluminum to aluminum welds and steel to steel welds. We have also found that the diameter "B" of the curved weld face 54 of the electrode 16, FIG. 3, is a feature of the welding electrode design and that the diameter of the electrode weld face 54 is related to the desired nugget size of the aluminum to aluminum weld. The minimum acceptable nugget diameter for aluminum to aluminum is approximately $4 \times (t)^{1/2}$ where t is the thickness of the thinner sheet of aluminum in a two sheet stack up of aluminum. We have found that the weld face 54 diameter B should be at least 1.5 mm larger than the acceptable nugget diameter, and preferably the electrode weld face 54 diameter should be at least 3 mm larger than the acceptable nugget diameter. As an example, if the thinner of sheets of aluminum is 1 mm thick, the nugget diameter for welding 1-mm thick aluminum sheet, $4 \times (t)^{1/2} = 4$ mm, should be 4 mm, and then the diameter of the weld face 54 would be the 4 mm, plus at least 1.5 mm. Thus the diameter B would be 5.5 mm diameter. Or, preferably the diameter of the weld face 54 would be 4 mm plus 3 mm, so that the diameter would be 7 mm.

In addition, we have found that the electrode face 54 should be textured to provide a surface roughness in the range of 2 micrometers to 50 micrometers in order to penetrate the tough, adherent oxide found on aluminum materials. In addition, for the electrode to work successfully, we have determined that the electrode material must have high conductivity, have high hardness or yield strength, and be able to resist softening at elevated temperatures. The electrode yield strength should be at least 400 MPa and preferably above 500 megapascals, (MPa) in order for the texture to have sufficient durability in use. The alloy must resist softening when exposed to the high temperatures that are obtained during spot welding of steel. We have found that the alloy must not soften at a temperature of at least 400° C. and preferably greater than 500° C. Finally, the alloy must have sufficient electrical conductivity to prevent overheating during the passage of high welding current required of aluminum. This must be greater than 80% conductivity under the International Annealed Copper Standard (IACS) and preferably greater than 90% IACS.

In addition, we have determined that during welding operations where (the use of) a single weld gun is used to make welds in both aluminum panels and steel panels, it should include the completion of all of the aluminum to aluminum welds, before making the steel to steel welds. In particular, we have found that making of the steel to steel weld will cause the buildup of zinc and iron contamination on the copper electrodes which will then be transferred to the aluminum panels and interfere with obtaining an effective corrosion resistant weld in the aluminum panel. However, although aluminum will be picked up by the electrode during the making of the aluminum to aluminum weld, we have found that the contamination of the steel weld with aluminum is not as problematic as the contamination of the aluminum weld with the zinc and iron. Accordingly, it is determined that the succession of aluminum to aluminum welds should be completed prior to making the steel to steel welds thereby avoiding the condition in which contamination resulting from the steel to steel welds could be transferred to the aluminum to aluminum welds. In addition, the making of steel to steel weld degrades the texturing faster than the making of aluminum to aluminum welds, thus also indicating that the aluminum to aluminum welds should be made prior to making the steel to steel welds.

It is also determined that subsequent to making the succession of steel to steel welds, the electrodes should then be cleaned and textured prior to again starting the aluminum to aluminum welds. Cleaning and texturing of the electrodes prior to aluminum to aluminum welding insures that no iron or zinc contamination from galvanized steel panels is transferred to the aluminum panels and that the electrode has a texture suitable for aluminum welding.

In addition, if extended aluminum welding is anticipated, the aluminum welding can be temporarily stopped and an intermediate cleaning and texturing operation can be done to restore the texture and remove any buildup of aluminum, thus avoiding the corrosion and pitting of the electrode face 54 that can be caused when too many aluminum to aluminum welds are attempted.

This cleaning/texturing of the weld electrodes can be accomplished most effectively by use of a flexible abrasive media such as a rubber backed silicon wheel, a Scotch-Brite wheel, or a stainless steel wire wheel to both clean the electrodes and restore the desired surface texture. Thus, the weld gun robot aligns the weld gun with the abrasive material and then the abrasive material can be rotated against the electrode face. Alternatively, the abrasive material can be held stationary and the robot can rotate or translate the electrode face across the surface of a fixed abrasive material. The abrasive both removes the buildup of aluminum and also creates a series of grooves or ridges in the surface to restore the desired surface texture. The cleaning process must remove all the contamination that has built up and do it in a sufficiently short time as not to interfere with production.

Figure 4:
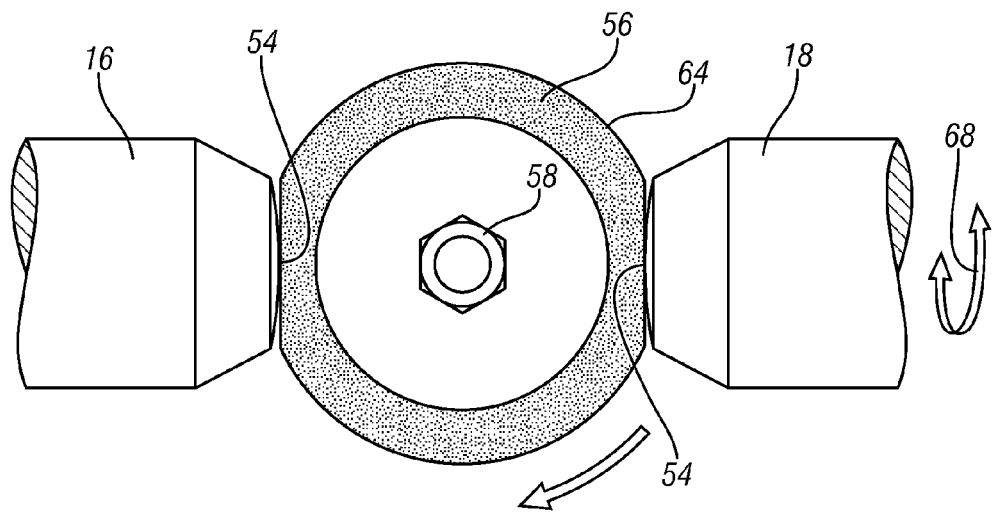
FIG. 4 is a side elevation view of a pair of electrodes being cleaned and retextured by an abrasive wheel.

FIG. 4 shows the example of a flexible media wheel 56 rotating on a horizontal shaft 58 with the opposed electrodes 16 and 18 pressing on the rim 64 of the flexible media wheel 56. The robot may rotate the electrodes 16 and 18 back and forth in the direction of arrows 68 so that all of the crowned surface of the face 54 of the electrodes is contacted uniformly by the rim 64 of the flexible media wheel 56.

Figure 5:
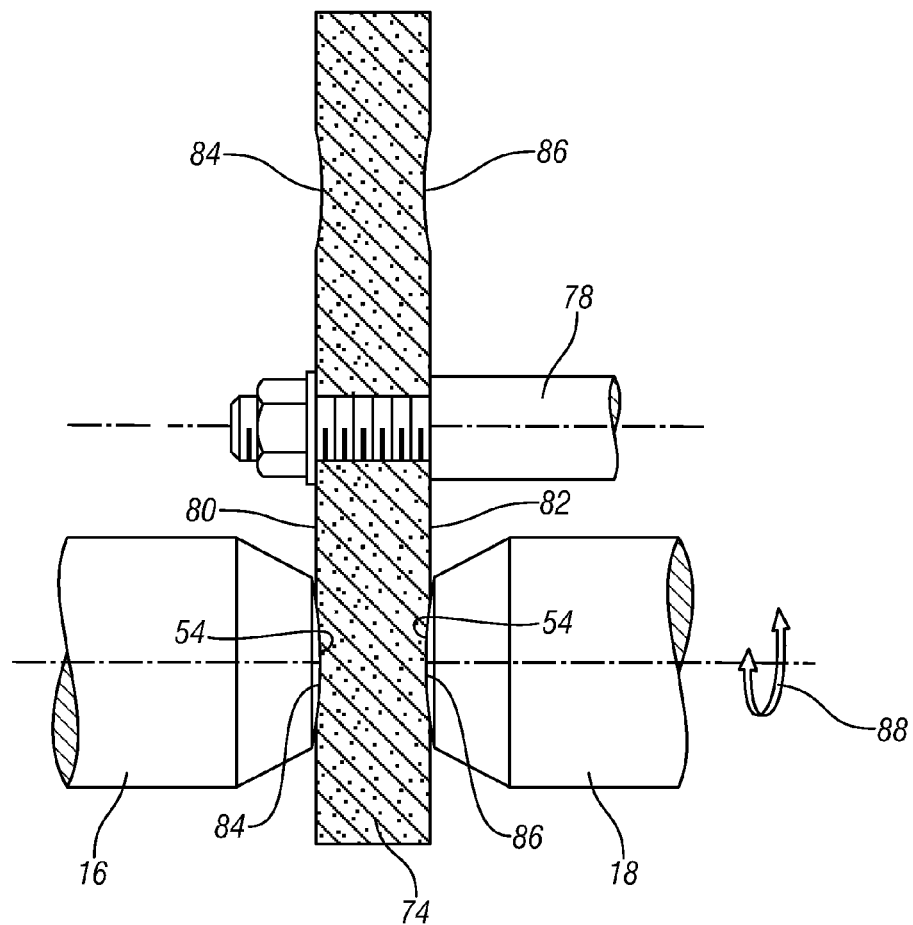
FIG. 5 is another side elevation view of the pair of electrodes being cleaned and retextured by an abrasive wheel.

FIG. 5 shows another example of a rigid abrasive wheel 74 rotating on a horizontal shaft 78 with the opposed electrodes 16 and 18 pressing on the opposite faces 80 and 82 of the rotating abrasive wheel 74. In FIG. 5 the abrasive wheel 74 is a rigid abrasive wheel with curved bottom grooves 84 and 86 that fit the curvature of the electrode face 54. The robot may rotate the electrodes 16 and 18 back and forth in the direction of arrows 88 so that all of the surface of the electrode face 54 of the electrodes 16 and 18 will be contacted uniformly by the faces 80 and 82 of the abrasive wheel 74.

Figure 6:
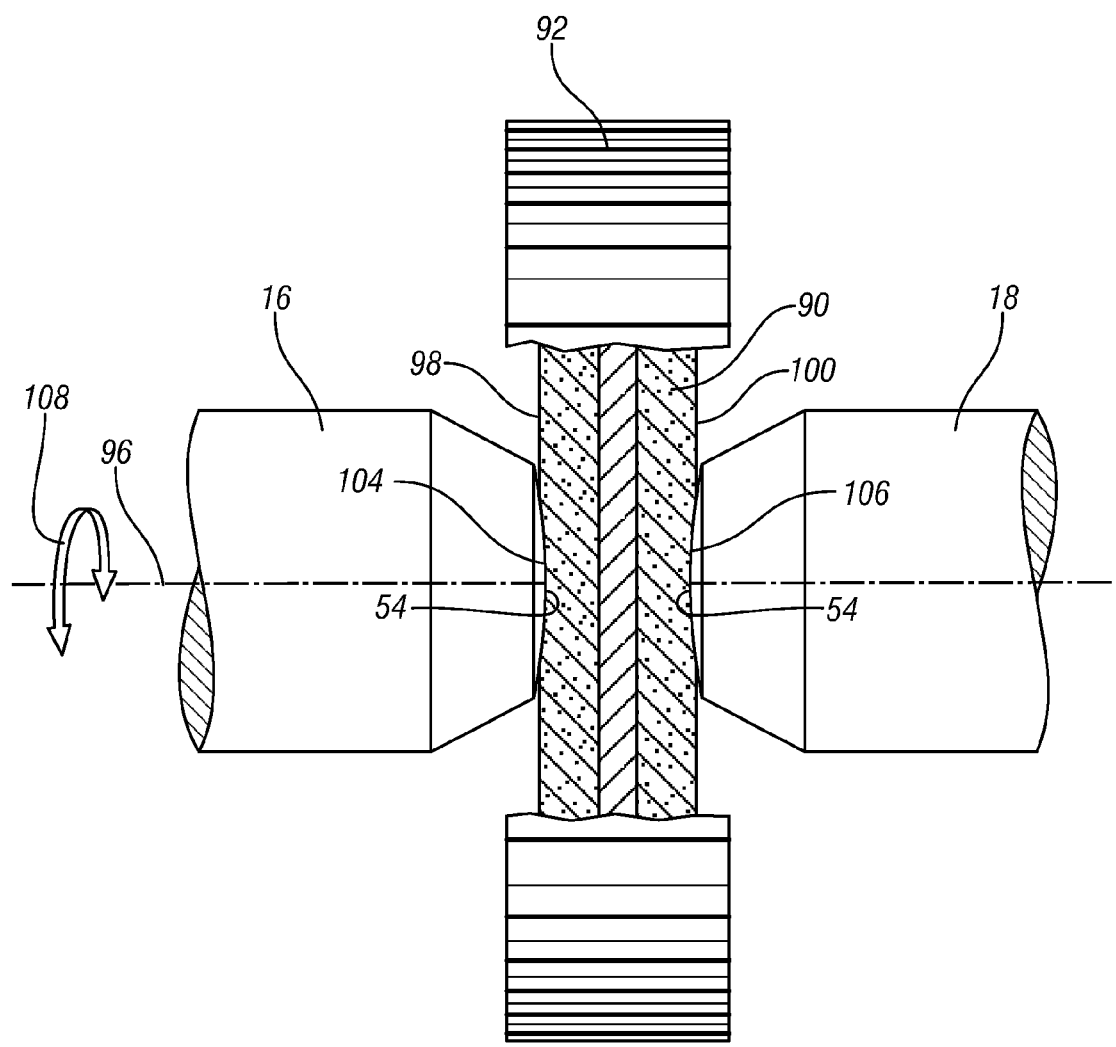
FIG. 6 is another side elevation view of a pair of electrodes being cleaned and retextured by an abrasive wheel.

FIG. 6 shows another example of a rotating abrasive wheel 90 which is captured in a rotating gear 92 that rotates on an axis 96 that is coincident with the axis of the opposed electrodes 16 and 18, which press on the opposite faces 98 and 100 of rotating abrasive wheel 90. In FIG. 6 the abrasive wheel 90 can be a rigid abrasive wheel with curved bottom grooves 104 and 106 that fit the curvature of the electrode face 54. Or the abrasive wheel can be a flexible media that yields to the crowned shape of the electrode face.

In addition, we have found that the method should include the monitoring of the electrodes for the occurrence of mushrooming, which typically occurs during spot welding of steel due to the high temperatures and pressures encountered. Monitoring is most easily accomplished using robot-mounted, servo-gun equipment with sensors to monitor the servo ram displacement. The length of each electrode can be determined by having the robot bring the stationary electrode in contact with a reference block, such as a block of steel mounted at a fixed location. Monitoring of the robot motion required to contact the stationary electrode will give the length of the stationary electrode. Closing of the servo gun and monitoring the ram motion will give the length of the movable electrode. Comparing the electrode length to that determined at an earlier time is used to determine the shortening of the electrode due to mushrooming. Once one of the electrodes has reached a predetermined degree of shortening, the electrodes would be redressed and a new length reference point determined. For servo-guns not mounted on robots, gun closure can still determine electrode length change, but closure will give the total change of both electrodes and not the length change of individual electrodes. Determination of electrode length would preferably be done while panels were being transported between stations and no welding was underway. Preferably the amount of shortening would not exceed 0.1 mm before dressing is initiated. Alternatively, the robot control would be designed to track the number of welds made, particularly steel welds, and at a predetermined count, initiate dressing. The electrodes are dressed to restore the shape of FIG. 2. Electrode dressing equipment and processes are well known in the prior art, in order to restore the shape of the electrode to that of FIG. 2. In particular, the dressing operation removes the mushroomed material and restores the desired face diameter and radius of curvature to the electrode face 54. After being dressed to restore the proper shape, the electrodes are again abraded by the abrasive material in order to restore the desired textured surface.

Figure 7:
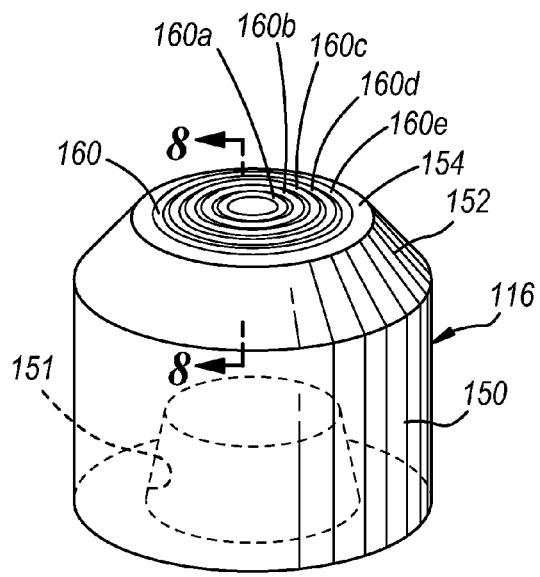
FIG. 7 is a perspective view of another embodiment of an electrode for use in the practice of this invention.
Figure 8:
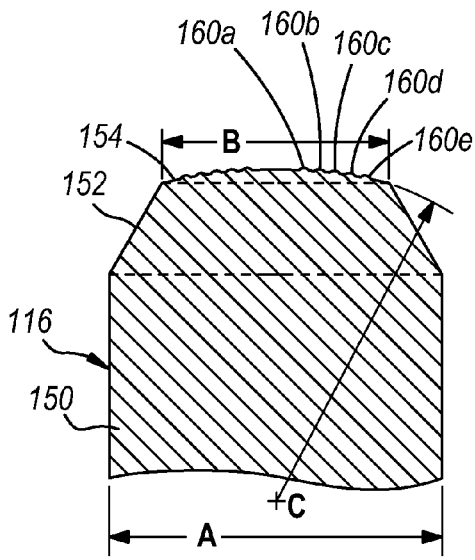
FIG. 8 is a side elevation view of the electrode of FIG. 7 having parts broken away and in section.
Figure 9:
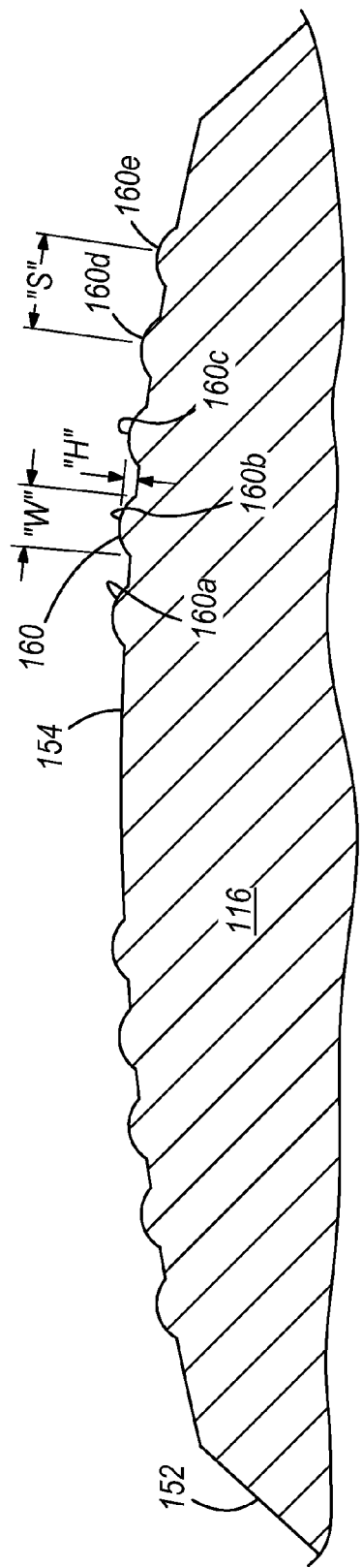
FIG. 9 is an enlarged fragment of FIG. 8.

FIGS. 7, 8 and 9 show another embodiment of the invention. In FIGS. 7 and 8, a copper electrode 116 has a round body 150 with a truncated conical end 152. Body 150 has a hollow receptacle 151 adapted to receive a shank 17 for insertion into the electrode holder 22. Weld face 154 of the truncated conical end 152 is crowned. As in the embodiment of FIGS. 1 through 6, we have found that the radius of curvature of the crown of electrode weld face 154 should be in the range between 20 mm and 40 mm in order to provide an electrode that is effective to make both the aluminum to aluminum welds and steel to steel welds.

As seen in FIGS. 7, 8, and 9, the weld face 154 of the electrode 116 is machined to provide a plurality of concentrically arranged circular ridges 160 that project from the weld face 154. In particular, as seen in the example at FIGS. 7, 8, and 9, a plurality of circular ridges includes ridges 160a, 160 b, 160c, 160d, and 160e. As seen in FIG. 9 the circular ridges each project from the weld face 154 by a height "H" that ranges between 20 μm and 200 μm, and a spacing from ridge to ridge "S" in the range of 80 μm to 1500 μm. The width "W of a circular ridge is in the range of 40 μm to 2000 μm.

The circular ridges 160 are preferably a circular cross-sectional shape, as seen in FIG. 9. Alternatively the circular ridges 160 can be more triangular or rectangular in cross-section. Although FIGS. 7, 8, and 9 herein show five concentric ridges, it will be understood that either a greater number or lesser number of circular ridges may be employed depending on variations in the width of the circular ridges and the spacing between the circular ridges.

Figure 10:
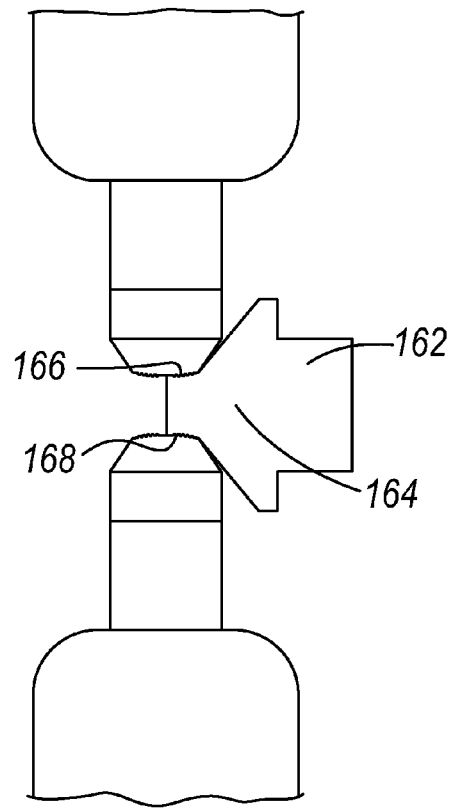
FIG. 10 is a side elevation view of a pair of electrodes being cleaned and dressed by a cutting blade.
Figure 11:
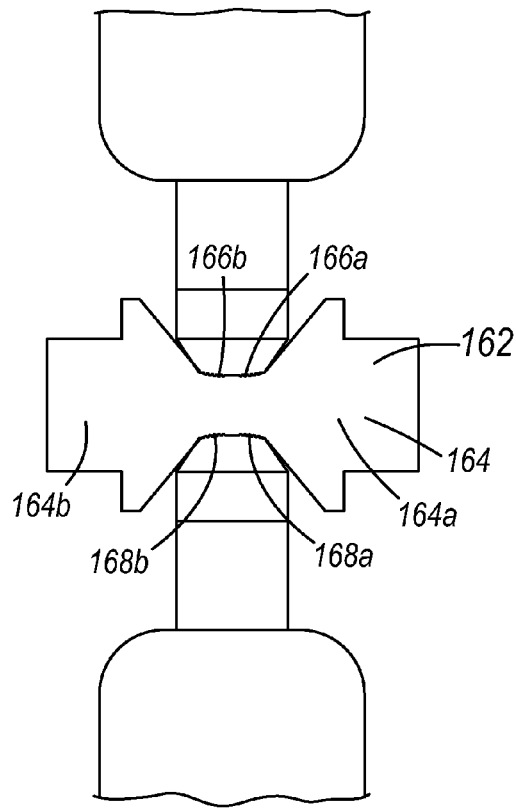
FIG. 11 is another side elevation view of a pair of electrodes being cleaned and dressed by a cutting blade.

As in the example of FIGS. 1 through 6, the electrode of FIGS. 7, 8, and 9 will be cleaned and dressed subsequent to making the succession of steel to steel welds and before once again starting to make the aluminum to aluminum welds. Referring to FIGS. 10, 11 and 12, a mechanism is shown for cleaning and dressing the electrodes. In particular, FIG. 10 shows the example where a dressing tool 162 includes a blade 164 having an upper cutting face 166 for cleaning and dressing a first electrode and a lower cutting face 168 for simultaneously cleaning and dressing the weld face 154 of a second electrode. The blade 164 will be rapidly rotated between the electrodes by a drive mechanism, not shown, typically while the electrodes remain mounted on the weld gun. Or, alternatively, the electrodes can be positioned in a holding fixture and rapidly rotated relative to a fixed blade 164.

In FIG. 11, the dressing tool 162 includes a blade 164 having a flute 164a with upper cutting face 166a and lower cutting face 168a, and a flute 164b having an upper cutting face 166b and lower cutting face 168b. Accordingly, the dressing tool of FIG. 11 is seen as having a greater region of contact with the weld face 154 of the electrodes and may be more expeditious in cleaning and dressing the circular ridges 160 of the weld face 154.

It will be appreciated the welding process using the electrode 116 of FIGS. 7-9 will be practiced using the same process parameters as described herein in the use of the electrode of FIGS. 2 and 3. During welding operations where a single weld gun is used to make welds in both aluminum panels and steel panels, it should include the completion of all of the aluminum to aluminum welds, before making the steel to steel welds. Then the weld face 154 is cleaned and dressed prior to making the next succession of the aluminum to aluminum welds. Furthermore, the yield strength of the copper electrode 116 is preferably above 500 MPa, the electrode is of a copper alloy that does not soften at a temperature of 400° C., and the electrode has an electrical conductivity of greater than 80% IACS conductivity and preferably greater than 90% IACS.

Thus, it is seen that the invention provides a new and improved welding method that can accomplish the welding together of both aluminum to aluminum panels and steel to steel panels by a single weld gun in a single manufacturing cell.

The invention claimed is:

1. A method of resistance spot welding aluminum-to-aluminum and steel-to-steel using a single resistance spot welding gun apparatus, the method comprising:
   providing a spot welding gun apparatus that carries a pair of opposed electrodes, each of the pair of opposed electrodes having a body and a crowned weld face at one end of the body, the crowned weld face of each electrode having a spherical radius of curvature between 20 mm and 40 mm and further comprising a plurality of concentrically arranged circular ridges that project outwards away from the weld face;
   forming a series of aluminum to aluminum welds, wherein formation of each of the aluminum to aluminum welds comprises pressing the opposed electrodes of the spot welding gun apparatus against opposite sides of an assembly of two or more overlapping aluminum panels and exchanging current between the opposed electrodes;
   forming a series of steel to steel welds after forming the series of aluminum to aluminum welds, wherein formation of each of the steel to steel welds comprises pressing the opposed electrodes of the spot welding gun apparatus against opposite sides of an assembly of two or more overlapping steel panels and exchanging current between the opposed electrodes; and
   dressing each of the electrodes after forming the series of steel to steel welds and before forming another series of aluminum to aluminum welds, wherein, for each of the opposed electrodes, the dressing includes restoring the spherical radius of curvature of the weld face and the plurality of concentrically arranged circular ridges on the weld face, and removing contamination from the weld face that has accumulated as a result of forming the series of aluminum to aluminum welds and the series of steel to steel welds.

2. The method set forth in claim 1, wherein each of the plurality of concentrically arranged circular ridges on the weld face of each electrode projects outwardly from its associated weld face to a height of between 20 μm and 200 μm, and wherein the circular ridges on each weld face are spaced apart from one another by a distance of 80 μm to 1500 μm.

3. The method set forth in claim 1, wherein each of the plurality of concentrically arranged circular ridges on the weld face of each electrode has a width ranging from 40 μm to 2000 μm.

4. The method set forth in claim 1, wherein dressing each of the electrodes comprises engaging the weld face of the electrode with a cutting surface of a cutting blade and rotating the cutting blade around the weld face, the cutting surface of the cutting blade being configured to cut the plurality of concentrically arranged circular ridges into the weld face.

5. The method set forth in claim 1, further comprising dressing each of the opposed electrodes during formation of the series of aluminum to aluminum welds so as to restore the spherical radius of curvature of the weld face and the plurality of concentrically arranged circular ridges on the weld face and to further remove contamination from the weld face that has accumulated as a result of forming aluminum to aluminum welds.

6. The method set forth in claim 1, further comprising monitoring each of the electrodes for the occurrence of mushrooming during formation of the series of steel to steel welds.

7. The method set forth in claim 6, wherein monitoring each of the electrodes for the occurrence of mushrooming comprises determining a length of the electrode and comparing that length to a length determined at an earlier time.

8. The method set forth in claim 1, wherein each of the opposed electrodes has a yield strength of 400 MPa or greater and an electrical conductivity of greater than 90% IACS.

9. The method set forth in claim 1, wherein the weld face of each electrode has a diameter (d) in millimeters that satisfies the following equation: $d = 1.5 \text{ mm} + 4(t)^{1/2}$, wherein (t) is a thickness of the thinnest aluminum panel included in the assembly of two or more overlapping aluminum panels.

10. The method set forth in claim 9, wherein the weld face of each electrode has a diameter (d) in millimeters that satisfies the following equation: $d = 3.0 \text{ mm} + 4(t)^{1/2}$, wherein (t) is a thickness of the thinnest aluminum panel included in the assembly of two or more overlapping aluminum panels.

11. A method of resistance spot welding aluminum-to-aluminum and steel-to-steel using a single resistance spot welding gun apparatus, the method comprising:

providing a spot welding gun apparatus that carries a pair of opposed electrodes, each of the pair of opposed electrodes having a body and a crowned weld face at one end of the body, the crowned weld face of each electrode having a spherical radius of curvature between 20 mm and 40 mm and further comprising a plurality of concentrically arranged circular ridges that project outwards away from the weld face;

forming a series of aluminum to aluminum welds, wherein formation of each of the aluminum to aluminum welds comprises pressing the opposed electrodes of the spot welding gun apparatus against opposite sides of an assembly of two or more overlapping aluminum panels and exchanging current between the opposed electrodes;

halting formation of the series of aluminum to aluminum welds and removing contamination derived from the aluminum panels from the weld face of each of opposed electrodes, followed by resuming and completing the formation of the series of aluminum to aluminum welds;

forming a series of steel to steel welds after forming the series of aluminum to aluminum welds, wherein formation of each of the steel to steel welds comprises pressing the opposed electrodes of the spot welding gun apparatus against opposite sides of an assembly of two or more overlapping steel panels and exchanging current between the opposed electrodes.

12. The method set forth in claim 11, further comprising:
dressing each of the electrodes after forming the series of steel to steel welds and before forming another series of aluminum to aluminum welds, wherein, for each of the opposed electrodes, the dressing includes restoring the spherical radius of curvature of the weld face and the plurality of concentrically arranged circular ridges on the weld face, and removing contamination from the weld face that has accumulated as a result of forming the series of aluminum to aluminum welds and the series of steel to steel welds.

13. The method set forth in claim 12, wherein dressing each of the electrodes comprises engaging the weld face of the electrode with a cutting surface of a cutting blade and rotating the cutting blade around the weld face, the cutting surface of the cutting blade being configured to cut the plurality of concentrically arranged circular ridges into the weld face.

14. The method set forth in claim 11, wherein halting formation of the series of aluminum to aluminum welds and removing contamination from the weld face of each of opposed electrodes comprises dressing the electrode to restore the spherical radius of curvature of the weld face and the plurality of concentrically arranged circular ridges on the weld face.

15. The method set forth in claim 14, wherein dressing the electrode comprises engaging the weld face of the electrode with a cutting surface of a cutting blade and rotating the cutting blade around the weld face, the cutting surface of the cutting blade being configured to cut the plurality of concentrically arranged circular ridges into the weld face.

16. The method set forth in claim 11, wherein each of the opposed electrodes has a yield strength of 400 MPa or greater and an electrical conductivity of greater than 90% IACS.

17. The method set forth in claim 11, wherein the weld face of each electrode has a diameter (d) in millimeters that satisfies the following equation: $d=1.5 \text{ mm}+4(t)^{1/2}$, wherein (t) is a thickness of the thinnest aluminum panel included in the assembly of two or more overlapping aluminum panels.

18. The method set forth in claim 11, wherein each of the plurality of concentrically arranged circular ridges on the weld face of each electrode projects outwardly from its associated weld face to a height of between 20 μm and 200 μm, wherein the circular ridges on each weld face are spaced apart from one another by a distance of 80 μm to 1500 μm, and wherein each of the plurality of concentrically arranged circular ridges on the weld face of each electrode has a width ranging from 40 μm to 2000 μm.

19. A method of resistance spot welding aluminum-to-aluminum and steel-to-steel using a single resistance spot welding gun apparatus, the method comprising:

providing a spot welding gun apparatus that carries a pair of opposed electrodes, each of the pair of opposed electrodes having a body and a crowned weld face at one end of the body, the crowned weld face of each electrode having a spherical radius of curvature between 20 mm and 40 mm and further comprising a plurality of concentrically arranged circular ridges that project outwards away from the weld face;

forming a series of aluminum to aluminum welds, wherein formation of each of the aluminum to aluminum welds comprises pressing the opposed electrodes of the spot welding gun apparatus against opposite sides of an assembly of two or more overlapping aluminum panels and exchanging current between the opposed electrodes;

forming a series of steel to steel welds after forming the series of aluminum to aluminum welds, wherein formation of each of the steel to steel welds comprises pressing the opposed electrodes of the spot welding gun apparatus against opposite sides of an assembly of two or more overlapping steel panels and exchanging current between the opposed electrodes; and dressing each of the electrodes after forming the series of steel to steel welds and before forming another series of aluminum to aluminum welds by engaging the weld face of each of the electrodes with a cutting surface of a cutting blade and rotating the cutting blade around the weld face to restore the spherical radius of curvature of the weld face and the plurality of concentrically arranged circular ridges on the weld face, and to remove contamination from the weld face that has accumulated as a result of forming the series of aluminum to aluminum welds and the series of steel to steel welds.

20. The method set forth in claim 19, wherein dressing each of the electrodes after forming the series of steel to steel welds comprises:

engaging an upper cutting surface of the cutting blade with the weld face of one of the pair of opposed electrodes;

engaging a lower cutting surface of the cutting blade with the weld face of the other of the pair of opposed electrodes; and rotating the cutting blade around both electrodes to simultaneously dress each of the pair of electrodes.

* * * * *